(12) United States Patent
Beierschmitt (10) Patent No.: US 12,413,393 B2
(45) Date of Patent: Sep. 9, 2025

(54) SCRAMBLED ADDRESS-BASED SECURITY

(71) Applicant: Schneider Electric USA, Inc., Andover, MA (US)

(72) Inventor: Joseph R. Beierschmitt, Marion, IA (US)

(73) Assignee: Schneider Electric USA, Inc., Boston, MA (US)

( * ) Notice: Subject to any disclaimer, the term of this patent is extended or adjusted under 35 U.S.C. 154(b) by 211 days.

(21) Appl. No.: 18/102,159

(22) Filed: Jan. 27, 2023

(65) Prior Publication Data

US 2024/0259187 A1    Aug. 1, 2024

(51) Int. Cl.
| | |
|---|---|
| H04L 9/08 | (2006.01) |
| G06F 21/44 | (2013.01) |
| H04L 9/26 | (2006.01) |
| G06F 21/71 | (2013.01) |
| H04L 9/16 | (2006.01) |

(52) U.S. Cl.
CPC ............ H04L 9/0825 (2013.01); H04L 9/085 (2013.01); H04L 9/0869 (2013.01)

(58) Field of Classification Search
None
See application file for complete search history.

(56) References Cited

U.S. PATENT DOCUMENTS

| | | | |
|---|---|---|---|
| 9,246,681 B2* | 1/2016 | Carper | H04L 9/0869 |
| 11,294,874 B2* | 4/2022 | Ikai | G06F 16/245 |
| 2010/0070777 A1 | 3/2010 | Salters et al. | |
| 2018/0365434 A1* | 12/2018 | Ke | H04L 9/0894 |
| 2019/0068368 A1 | 2/2019 | Moriyama | |
| 2023/0052597 A1* | 2/2023 | Euchner | H04L 9/14 |
| 2023/0318808 A1* | 10/2023 | Osborn | H04L 9/0877 |
| | | | 713/171 |

OTHER PUBLICATIONS

Extended European Search Report dated Jun. 28, 2024 for corresponding European Patent Application No. 24153198.7-1218, 6 pages.

* cited by examiner

Primary Examiner — Venkat Perungavoor (57) ABSTRACT

Embodiments described herein provide techniques for generating a security key for use in authenticating a device. Embodiments divide a unique identifier into an ordered plurality of portions, wherein the unique identifier is associated with a first device. A plurality of values is retrieved from an indexable data structure by accessing the indexable data structure using each of the plurality of portions as an index, where the indexable data structure stores a plurality of unique values in a random or pseudorandom order. Embodiments process the retrieved plurality of values to generate a security key and use the security key in processing one or more data communication messages between the first device and a remote computing device.

20 Claims, 6 Drawing Sheets

SCRAMBLED ADDRESS-BASED SECURITY

TECHNICAL FIELD

The present disclosure relates to electronic device security, and more particularly, to techniques for dynamically generating a security key for use in authenticating a network device.

BACKGROUND

Connected devices of a variety of types are becoming increasingly common in modern homes, factories and many other environments. While networks of connected devices offer many benefits and improvements over conventional environments, such environments present new network security challenges. One such challenge is presented when adding new devices to an already secured network, as such devices generally need to be authenticated to prevent malicious devices from joining the network. While in some instances network devices can be preconfigured with security credentials that can be used to authenticate the devices, many devices are not preconfigured in this way. As such, a technical problem exists in how to securely authenticate these devices before adding them to the network.

SUMMARY

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

One embodiment provides a method, system and computer program product that include retrieving, on a first device, an indexable data structure storing a plurality of unique values in a random or pseudorandom order. The method, system and computer program product further include dividing a unique identifier into a first ordered plurality of index values, wherein the unique identifier is associated with a first device. Additionally, the method, system and computer program product include retrieving a first ordered plurality of values from an indexable data structure by accessing the indexable data structure using each of the first ordered plurality of index values as an index, where the indexable data structure stores a plurality of unique values in a random or pseudorandom order. The method, system and computer program product also include generating a second ordered plurality of index values by processing each of the index values in the first ordered plurality of index values using a predefined transformation operation. The method, system and computer program product further include retrieving a second ordered plurality of values from the indexable data structure by accessing the indexable data structure using each of the second ordered plurality of index values as an index. The method, system and computer program product include combining the first ordered plurality of values and the second ordered plurality of values into a security key. The method, system and computer program product additionally include using the security key in processing one or more data communication messages between the first device and a remote computing device.

Another embodiment provides a method, system and computer program product that include dividing a unique identifier into an ordered plurality of portions, wherein the unique identifier is associated with a first device. The method, system and computer program product also include retrieving a plurality of values from an indexable data structure by accessing the indexable data structure using each of the plurality of portions as an index, where the indexable data structure stores a plurality of unique values in a random or pseudorandom order. Additionally, the method, system and computer program product include combining the retrieved plurality of values into a security key. The method, system and computer program product further include using the security key in processing one or more data communication messages between the first device and a remote computing device.

Another embodiment provides a method, system and computer program product that include dividing a unique identifier into an ordered plurality of portions, wherein the unique identifier is associated with a first device. The method, system and computer program product further include retrieving a first ordered plurality of values from an indexable data structure by accessing the indexable data structure using each of the plurality of portions as an index, where the indexable data structure stores a plurality of unique values in a random or pseudorandom order. Additionally, the method, system and computer program product include processing the first ordered plurality of values with a predefined processing algorithm to generate a second ordered plurality of values. The method, system and computer program product further include combining the first ordered plurality of values and the second ordered plurality of values to generate a security key. The method, system and computer program product also include using the security key in processing one or more data communication messages between the first device and a remote computing device.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

When adding a new device to a secure network, a number of security determinations are made to ensure the new device does not compromise the security of the network. For example, a Dynamic Host Configuration Protocol (DHCP) server could be configured to assign Internet Protocol (IP) addresses only to authenticated devices on the network. Doing so can prevent untrusted and potentially malicious devices from joining the network.

However, a technical challenge exists in how to authenticate and more generally how to trust a new device added to a network. While some computing devices have ample resources to store numerous predefined device identifiers and execute sophisticated, resource-intensive techniques for authenticating themselves, other devices are much more limited in their computing resources that may be insufficient to implement such resource-heavy techniques. Moreover, while some such techniques may require that a device be preconfigured with a unique identifier during manufacturing (e.g., stored on a secure Read-Only Memory (ROM) of the device at the factory during manufacturing), many other devices (especially Brownfield devices) are not manufactured with such preconfigured information and/or secure memories. As such, lightweight techniques for surely authenticating a device on a network are needed.

One embodiment described herein includes retrieving, on a first device, an indexable data structure storing a plurality of unique values in a random or pseudorandom order. A unique identifier associated with the first device is divided into a first ordered plurality of index values. Embodiments retrieve a first ordered plurality of values from an indexable data structure by accessing the indexable data structure using each of the first ordered plurality of index values as an index. In a particular embodiment, the indexable data structure stores a plurality of unique values in a random or pseudorandom order. A second ordered plurality of index values is generated by processing each of the index values in the first ordered plurality of index values using a predefined transformation operation. Embodiments retrieve a second ordered plurality of values from the indexable data structure by accessing the indexable data structure using each of the second ordered plurality of index values as an index and combine the first ordered plurality of values and the second ordered plurality of values into a security key. The security key can then be used in processing one or more data communication messages between the first device and a remote computing device.

Figure 1:
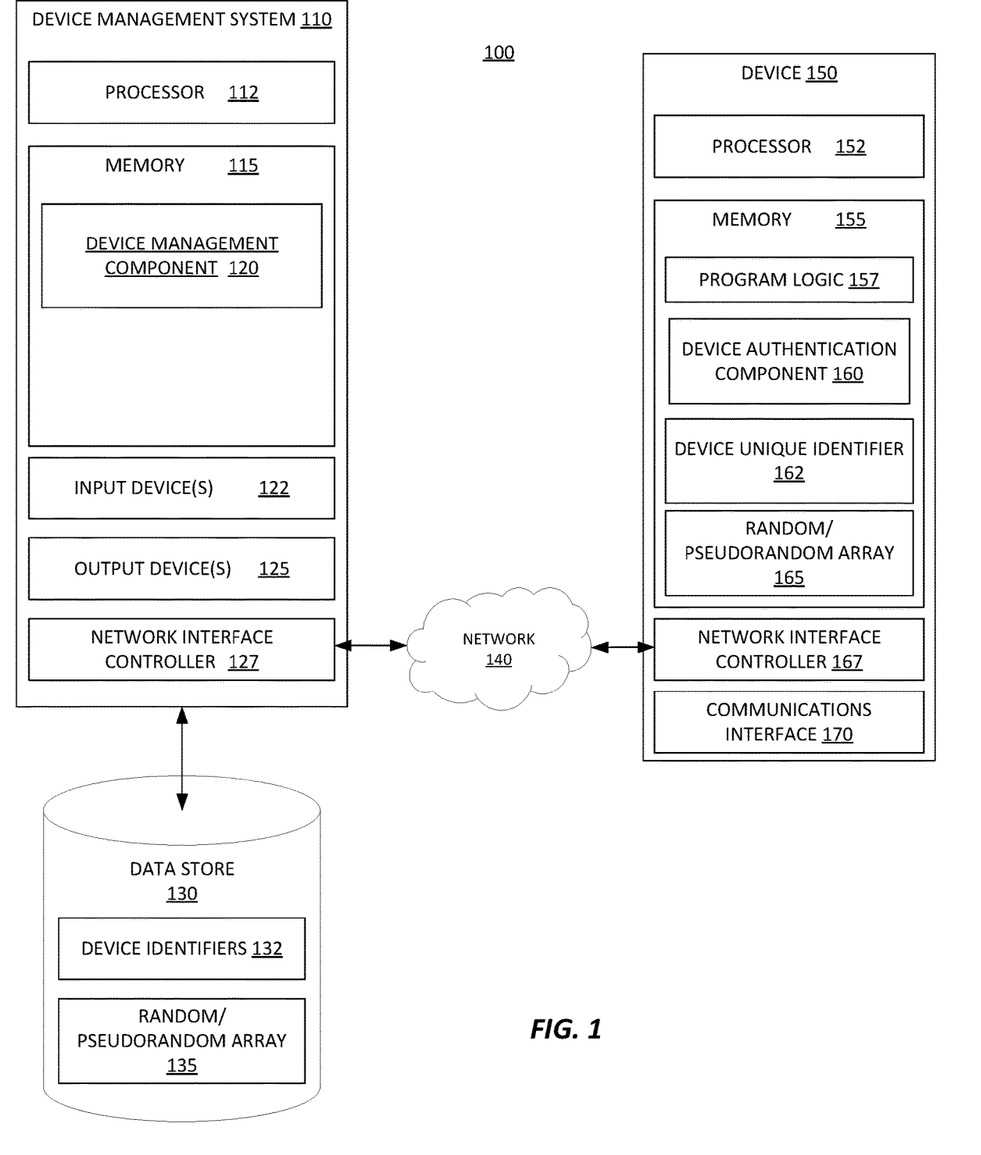
FIG. 1 is a block diagram illustrating a system configured with a device authentication component, according to one embodiment described herein.

FIG. 1 is a block diagram illustrating a system configured with a device authentication component, according to one embodiment described herein. As shown, the system 100 includes a device management system 110 and a device 150, interconnected via a network 140. The device management system 110 includes a processor 112, a memory, one or more input devices 122, one or more output devices 125 and a network interface controller 127. The memory includes a device management component 120.

Generally, the device management component 120 is configured to authenticate, configure and otherwise manage devices (including device 150) within the system 100. For example, the device management component 120 could be configured to facilitate the assignment of an Internet Protocol (IP) address to the device 150 on the network 140, upon authenticating the device 150 and determining that the device 150 is a trusted device.

The device 150 includes a processor 152, a memory 155, a network interface controller 167 and a communications interface 170. The memory 155 contains program logic 157, a device authentication component 160, a device unique identifier 162, and a random or pseudorandom array 165. Generally, the program logic 157 represents any application-specific program logic that resides on the device 150 and generally relates to the overall purpose of the device 150. For example, a particular automation device 150 within an industrial automation environment may have program logic 157 that relates to the function of the automation device within the industrial automation system. As another example, an energy management device 150 within a residential environment may be configured with program logic 157 configured to report on energy management metrics, to send notifications when a circuit breaker within the device 150 has tripped, or more generally any other functions that may be appropriate in a residential energy management context. Of course, such examples are for illustrative purposes only, and more generally any program logic 157 can be used for any of a variety of different environments and contexts, consistent with the functionality described herein.

Additionally, the device management system 110 is communicatively coupled to a data store 130. In the depicted embodiment, the data store 130 includes device identifiers 132 and a random/pseudorandom array 135. Generally, the device identifiers 132 represent unique identifiers of trusted devices within the system 100. In one or more embodiments, a unique identifier may comprise a Zigbee-Extended User Identifier (EUID). Further, in the one or more embodiments, the unique identifier may include an 8-byte value. Still further, in the one or more embodiments, the security key may include a 16-byte value. The random/pseudorandom array 135 generally corresponds to the random/pseudorandom array 165 in the memory 155 of the device 150.

In one embodiment, the device authentication component 160 on the device can retrieve the random/pseudorandom array 165. The random/pseudorandom array 165 comprises an indexable data structure storing a plurality of unique values in a random or pseudorandom order. The device authentication component 160 can divide the device unique identifier 162 into a first ordered plurality of index values. The device unique identifier 162 represents a data value that uniquely identifies the device 150 within a particular environment. For example, a device manufacturer that products multiple devices of various types can assign each device an identifier that uniquely identifies the respective device within the environment of all the manufacturer's ecosystem of devices.

The device authentication component 160 can retrieve a first ordered plurality of values from the random/pseudorandom array 165 by accessing the random/pseudorandom array 165 using each of the first ordered plurality of index values as an index. For example, the device authentication component 160 could divide the device unique identifier 162 into fixed-length portions (e.g., 2 bytes each) and could use each fixed-length portion as an index into the random/pseudorandom array 165.

In one embodiment, the device authentication component 160 is configured generate a second ordered plurality of index values by processing each of the index values in the first ordered plurality of index values using a predefined transformation operation. For example, the device authentication component 160 could apply a two's complement transformation operation on each of the index values within the first ordered plurality of index values, and the resulting values could be stored in the second ordered plurality of index values. In doing so, the device authentication component 160 could maintain the same ordering of the values, such that the first value in the second ordered plurality of index values corresponds to the transformed first value in the first ordered plurality of index values, the second value in the second ordered plurality of index values corresponds to the transformed second value in the first ordered plurality of index values, and so on.

The device authentication component 160 could then retrieve a second ordered plurality of values from the indexable data structure by accessing the indexable data structure using each of the second ordered plurality of index values as an index. For example, the device authentication component 160 could concatenate the values retrieved from the random/pseudorandom array 165 (e.g., when using the fixed-length portions as an index). The device authentication component 160 could combine the first ordered plurality of values and the second ordered plurality of values into a security key.

Upon forming the security key, the device authentication component 160 could use the security key in processing one or more data communication messages between the first device and a remote computing device. For example, the device authentication component 160 could provide the device unique identifier 162 and the generated security key to the device management component 120 on the device management system 110. Upon receiving the security key, the device management component 120 could generate a second security key using the aforementioned methodology using the received device unique identifier and the random/pseudorandom array 135 stored in the data store 130. The device management component 120 could compare the received security key and the second security key and upon determining that the two keys are identical, the device management component 120 could consider the device 150 as authenticated as a trusted device.

In one embodiment, the device management component 120 can determine that the device 150 is a limited trusted device. In such an embodiment, the device management component 120 may not give full access to the device 150 but may assign or facilitate the assignment of an IP address to the device 150 on the network 140. Once the device 150 is assigned a valid IP address, the device authentication component 160 on the device 150 could perform a second authentication process (e.g., with a remote server executing in a cloud computing environment) to fully authenticate the device 150. Upon successful completion of the second authentication process and the communication of such successful completion to the device management component 120, the device management component 120 may designate the device 150 a fully trusted device on the network 140 and may allow the device 150 to perform all operations within the system 100 corresponding to a trusted device. Of course, such an example is for illustrative purposes only, and one of ordinary skill in the art will recognize that the operations allowed by a trusted device can vary across different computing environments and installations.

Figure 2:
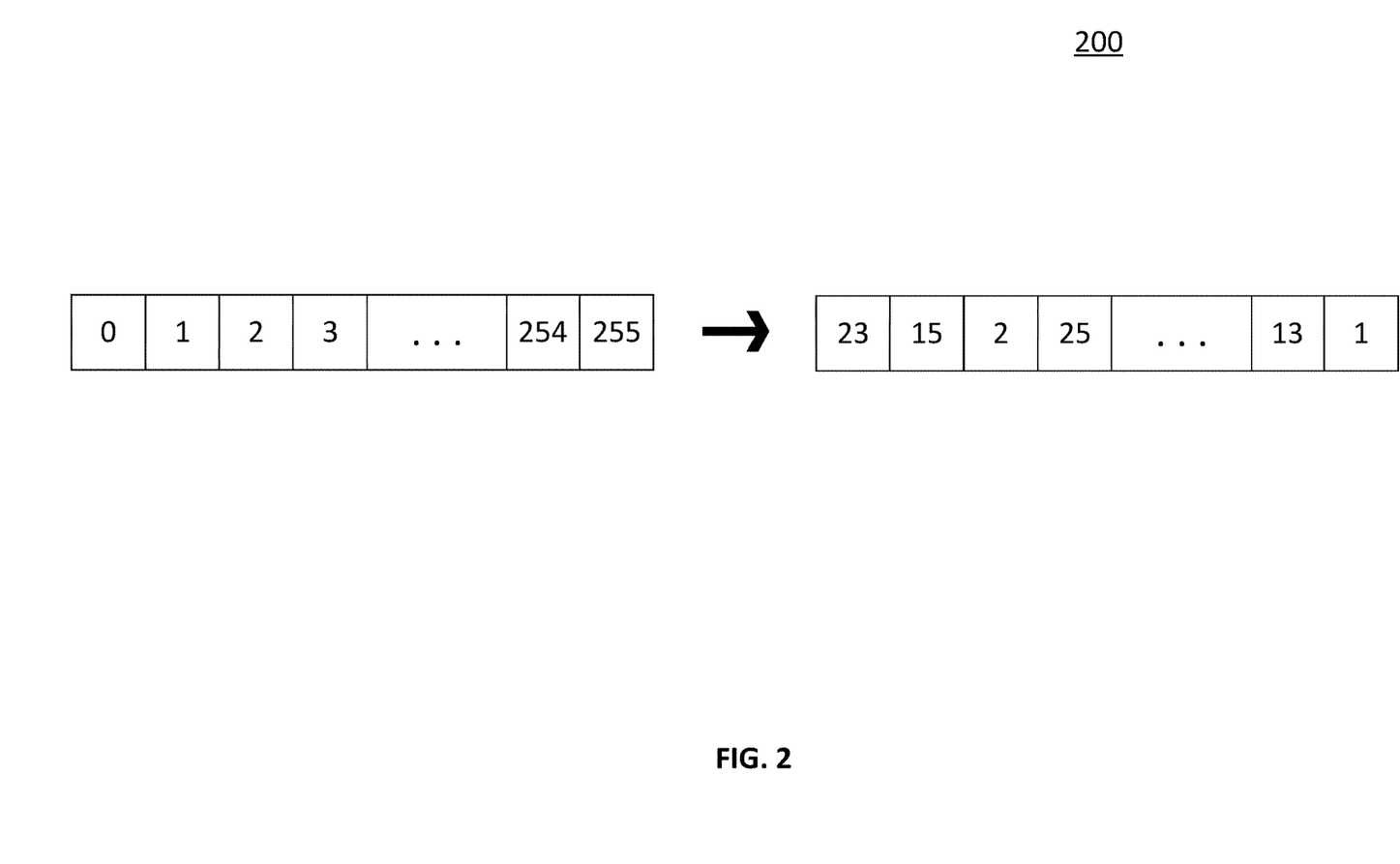
FIG. 2 is a diagram illustrating a technique for generating a random or pseudorandom array, according to one embodiment described herein.

FIG. 2 is a diagram illustrating a technique for generating a random or pseudorandom array, according to one embodiment described herein. As shown, the diagram 200 illustrates the generation of a random/pseudorandom array. In one embodiment, using an ordered array from 0 to 255, a software component (e.g., device management component 120) could shift the values in index to generate a random or pseudorandom array composed of unique values from 0 to 255, with each value in the range appearing only once in the array. For example, the software component could shift the entire array in a given direction a particular number of indices, allowing values to wrap around to the opposite end of the array as needed. As another example, the software component could select a plurality of pairs of indices (e.g., using a random number generator to generate two values between 0 and 255, ensuring that the same value is not selected twice) and could swap the values corresponding to these indices. The selection and swapping operations could be repeated a number of times until the array is determined to be sufficiently random or pseudorandom. Such a number could be a predefined number that is determined to produce a sufficiently random or pseudorandom array.

In an alternate embodiment, the software component could use a random number to generate a value between 1 and 255 for each index within the array, and the software component could discard any duplicate values (i.e., any values already inserted into the array). For example, a product manufacturer computing system could generate such an array and could deploy the resulting random/pseudorandom array on the device 150 at the time of manufacturer (e.g., the random/pseudorandom array 165 in memory 155). Such an array can additionally be deployed to the device management system 110 (e.g., the random/pseudorandom array 135 in the data store 130).

Figure 3A:
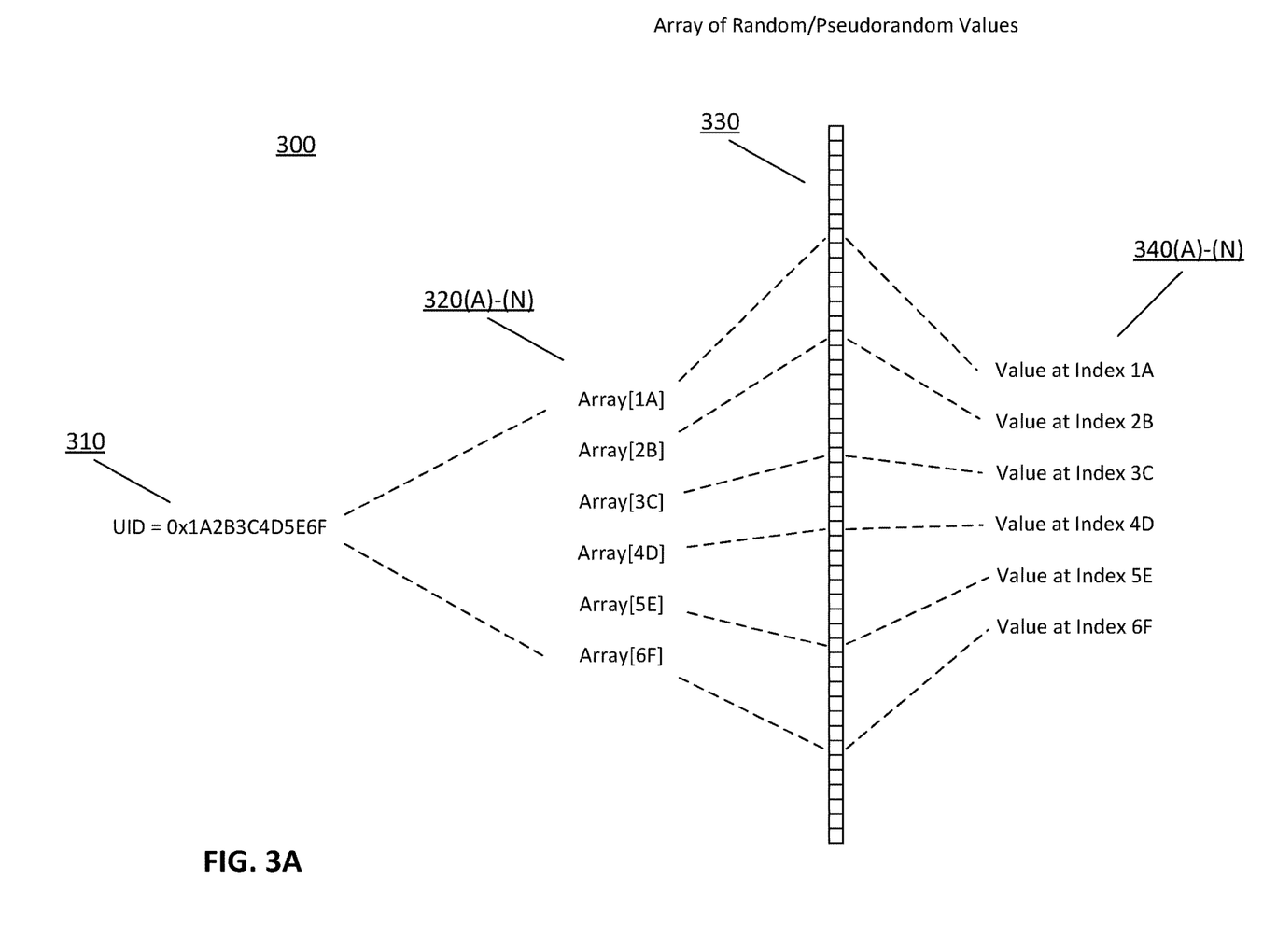
FIG. 3A-B are diagrams illustrating methods for generating a security key using a random or pseudorandom array, according to embodiments described herein.
Figure 3B:
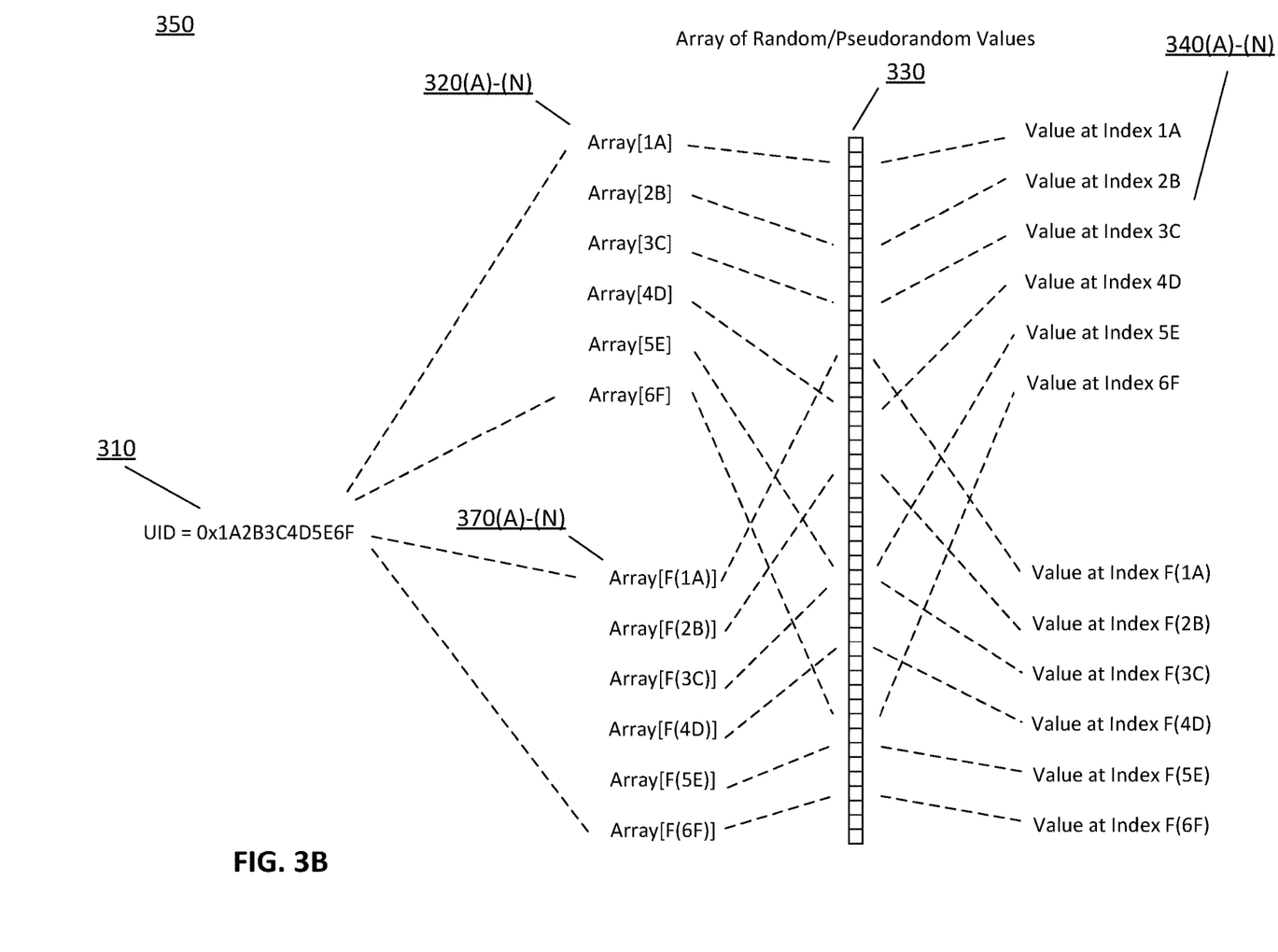

FIG. 3A-B are diagrams illustrating methods for generating a security key using a random or pseudorandom array, according to embodiments described herein. As shown in FIG. 3A, the diagram 300 illustrates a device unique identifier 310 for a device seeking to be authenticated on a network having an exemplary value of 0x1A2B3C4D5E6F. While in the depicted embodiment the device unique identifier 310 is a 6-byte value, such an example is provided for illustrative purposes only and one of ordinary skill in the art will quickly recognize that numerous formats and lengths for device identifiers can be used, consistent with the functionality described herein. More generally, any value that is specific to the device seeking to be authenticated within an environment or device ecosystem can be used as the device unique identifier, consistent with the functionality described herein.

Moreover, in other embodiments, a non-device identifier value can be used as the starting point for the techniques described herein. For example, a device management system determining whether to authenticate a new device on a network could provide a value to the new device and the new device could send back a transformed value using the techniques described herein, at which point the device management system can determine whether to authenticate the new device (e.g., by also generating a transformed value using the same techniques and a separate copy of the random/pseudorandom array, comparing the two transformed values and authenticating the new device upon determining that the two transformed values match).

Returning to the depicted embodiment, the device authentication component 160 for the device can divide the device unique identifier 310 into byte portions and can use each of the byte portions as an index 320(A)-(N) into an array of random/pseudorandom values 330 to retrieve the values 340(A)-(N). The values 340(A)-(N) can then be concatenated together following the same ordering as the indices were organized in when part of the UID 310. For example, in the depicted embodiment, the device authentication component 160 could order the values starting with the value for Index 1A, followed by the value for Index 2B, followed by the value for Index 3C, and so on, and by concatenating the values together in this manner, could form a new value representing a security key.

The device authentication component 160 could then use the resulting security key in a variety of ways. For example, the device authentication component 160 could use the security key to perform an asymmetric key exchange with a device management component 120 on the local network to authenticate the device on which the device authentication component 160 is executing. For example, the device authentication component 160 could encrypt the security key using a public key corresponding to the device management component 120 (e.g., a public key provided by the device management component 120 and which the device management component 120 can access a corresponding private key for). The device authentication component 160 could then transmit the encrypted security key to the device management component 120 over the local network. The device authentication component 160 could also provide the UID 310 to the device management component 120 by transmitting the device unique identifier over the local network.

Upon receiving the encrypted security key and UID, the device management component 120 could repeat the process depicted in diagram 300 on the received UID. For example, the device management component 120 could divide the received UID into fixed-length portions and could use each individual portion as an index to access values within a random/pseudorandom array 135 stored in the data store 130. The device management component 120 could then combine the resulting values preserving the ordering of the fixed-length portions in order to generate a new value.

The device management component 120 could then decrypt the received encrypted security key (e.g., using an existing private key corresponding to the public key used by the device authentication component 160 to encrypt the security key) and could compare the decrypted security key with the generated new value. If the device management component 120 determines the two values match, the device management component 120 could determine that the device on which the device authentication component 160 is executing is properly authenticated for purposes of network access on the local network.

In one embodiment, the device authentication component 160 is configured to only partially authenticate the device upon the compared keys matching. In such an embodiment, the device management component 120 could allow authenticated devices to access an external network (e.g., the Internet) for a limited period (e.g., a fixed period of time), upon authenticating the devices. For example, the device management component 120 could assign an IP address (e.g., via DHCP) to the authenticated device and could allow traffic from the authenticated device to access the external network for a predetermined period of time. The device authentication component 160 on the authenticated device could then access an external server (e.g., within a cloud computing environment) to perform a full authentication process with the external server. If such a full authentication process is successful, the external server could communicate this success to the device management component 120 and the device could be allowed full access on the network (e.g., the access level that is appropriate for a trusted device within the application-specific context). Of course, one of ordinary skill in the art will recognize that a number of different authentication algorithms and processes could be used by the external server to fully authenticate the device, and more generally any suitable authentication technique could be used consistent with the functionality described herein.

FIG. 3B illustrates an alternate embodiment in which the device authentication component 160 is configured to generate a security value from a UID by iterating through the fixed-length portions of the UID and using these fixed-length portions as indices multiple times. As shown, the device authentication component 160 in the diagram 350 has divided the UID into fixed-length portions of 1 byte each, resulting in the values 1A, 2B, 3C, 4D, 5E and 6F. Of course, such an example is provided for illustrative purposes only and one of ordinary skill in the art will recognize that portions of various lengths could be used, consistent with the functionality described herein.

The device authentication component 160 then iterates through a plurality of accesses to the array of random/pseudorandom values 330 using the fixed-length portions of the UID. In the depicted example, in a first iteration the device authentication component 160 uses the fixed-length portions as indices to access the array 330, shown as index operations 320(A)-(N). Additionally, in a second iteration, the device authentication component 160 accesses the array 330 by first processing the fixed-length portions of the UID using a predetermined function, and then uses the resulting value as an index into the array, shown as index operations 370(A)-(N) where function F( ) is used to process the fixed-length portions. For example, the predetermined function F( ) could be a two's complement operation, a bitwise negation operation, or more generally any suitable predefined function that is capable of generating a value from another value in a deterministic manner could be used, consistent with the functionality described herein.

Figure 4:
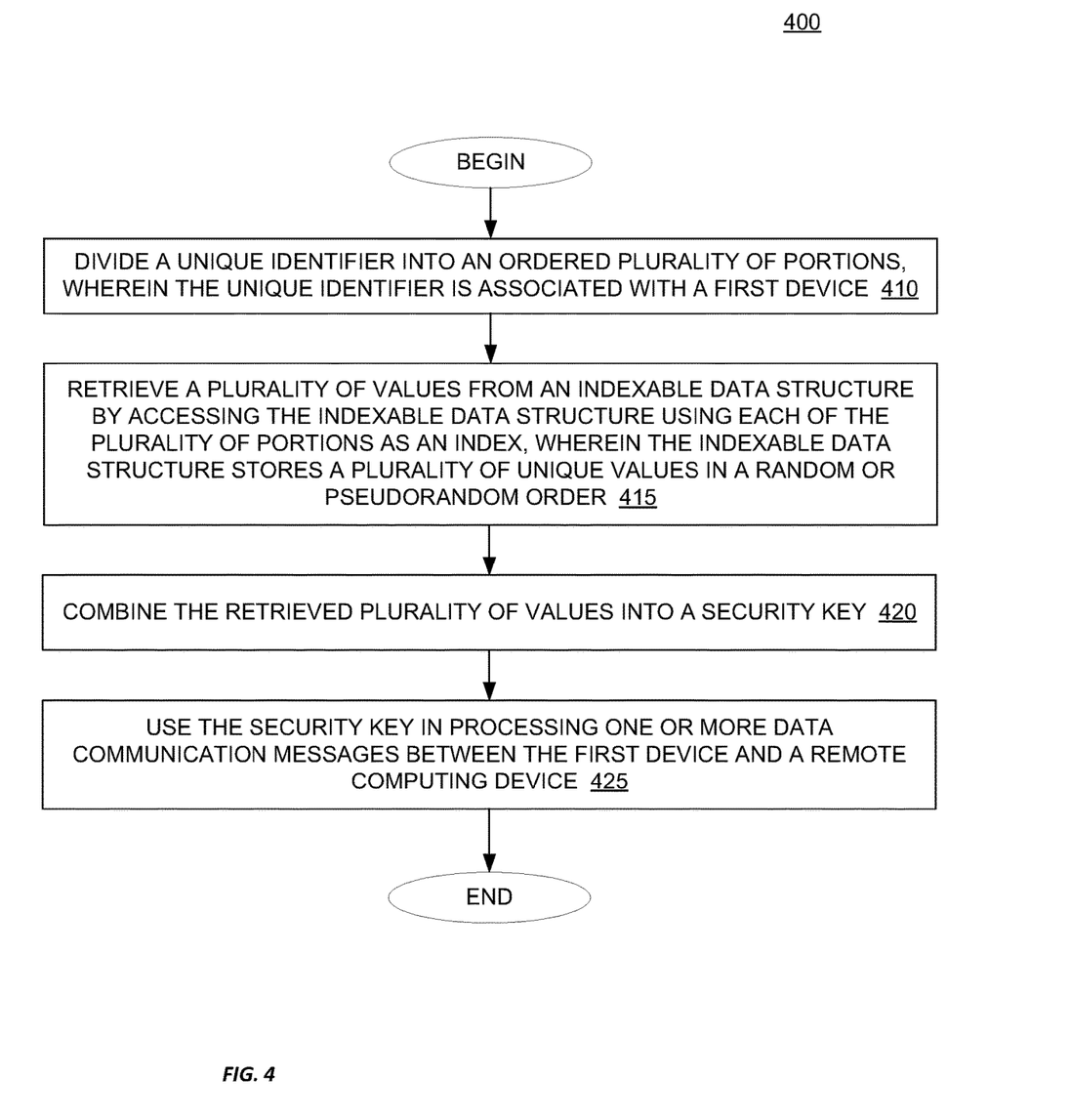
FIG. 4 is a flow diagram illustrating a method for generating a security key using a random or pseudorandom array, according to one embodiment described herein.

FIG. 4 is a flow diagram illustrating a method for generating a security key using a random or pseudorandom array, according to one embodiment described herein. As shown, the method 400 begins at block 410, where the device authentication component 160 divides a unique identifier into an ordered plurality of portions, where the unique identifier is associated with a first device. The device authentication component 160 retrieves a plurality of values from an indexable data structure by accessing the indexable data structure using each of the plurality of portions as an index (block 415). In one embodiment, the indexable data structure stores a plurality of unique values in a random or pseudorandom order.

The device authentication component 160 combines the retrieved plurality of values into a security key (block 420). Additionally, the device authentication component 160 uses the security key in processing one or more data communication messages between the first device and a remote computing device (block 425), and the method 400 ends.

Figure 5:
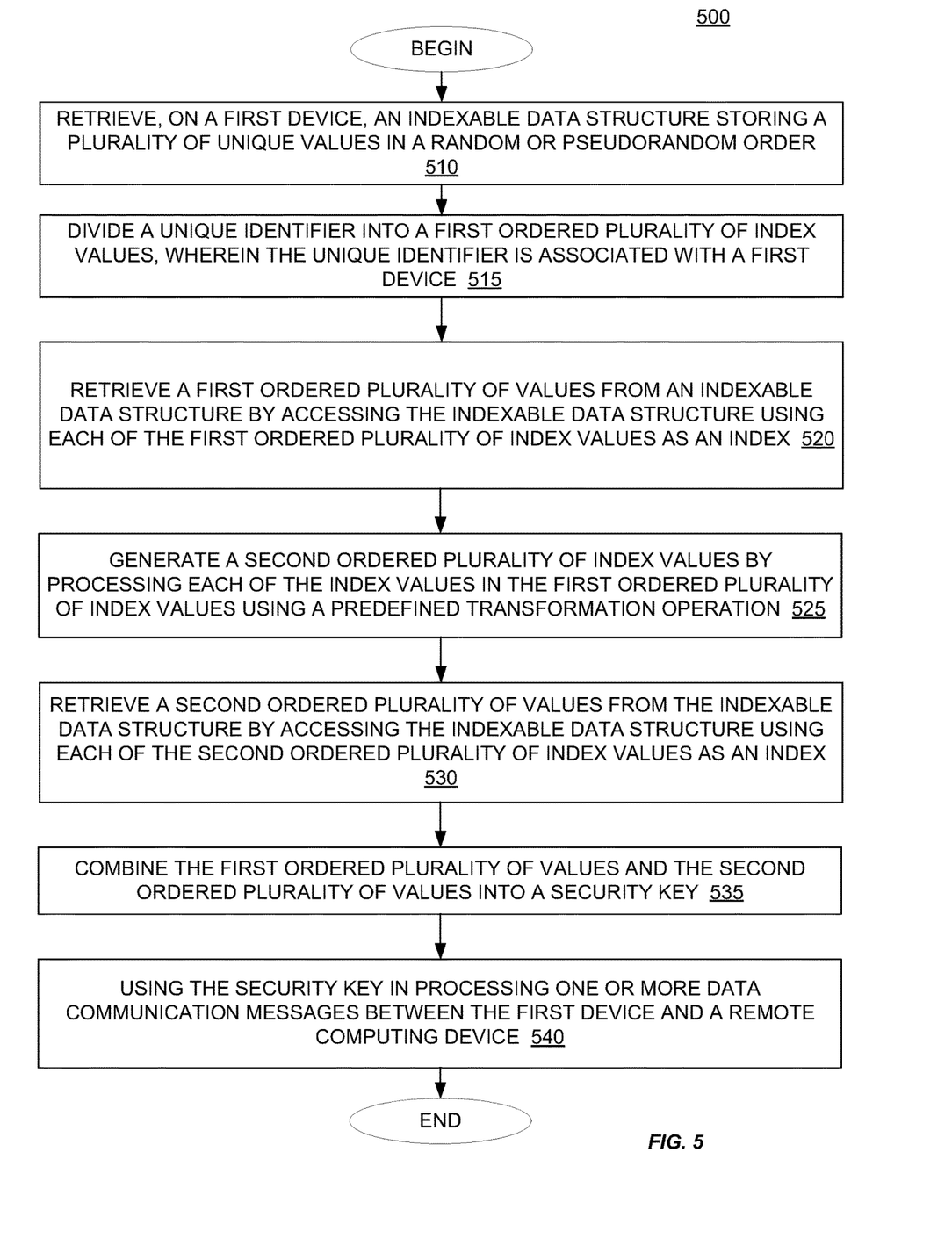
FIG. 5 is a flow diagram illustrating a method for generating a security key using a random or pseudorandom array, according to one embodiment described herein.

FIG. 5 is a flow diagram illustrating a method for generating a security key using a random or pseudorandom array, according to one embodiment described herein. As shown, the method 500 begins at block 510, where the device authentication component 160 retrieves, on a first device, an indexable data structure storing a plurality of unique values in a random or pseudorandom order. The device authentication component 160 divides a unique identifier into a first ordered plurality of index values, where the unique identifier is associated with a first device (block 515). The device authentication component 160 retrieves a first ordered plurality of values from an indexable data structure by accessing the indexable data structure using each of the first ordered plurality of index values as an index (block 520)

Additionally, the device authentication component 160 generates a second ordered plurality of index values by processing each of the index values in the first ordered plurality of index values using a predefined transformation operation (block 525). The device authentication component 160 then retrieves a second ordered plurality of values from the indexable data structure by accessing the indexable data structure using each of the second ordered plurality of index values as an index (block 530). Upon retrieving the second ordered plurality of values, the device authentication component 160 combines the first ordered plurality of values and the second ordered plurality of values into a security key (block 535). The device authentication component 160 uses the security key in processing one or more data communication messages between the first device and a remote computing device (block 540), and the method ends. For example, the device authentication component 160 could transmit the security key to a device management system 110 to obtain a valid IP address on a computing network. Once on the network, the device authentication component 160 could perform an authentication operation with a remote server to fully authenticate the device on the network. Once fully authenticated, the device may be given all permissions associated with a trusted device on the computing network.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

I claim:

1. A method, comprising:

retrieving, on a first device, an indexable data structure storing a plurality of unique values in a random or pseudorandom order;

dividing a unique identifier into a first ordered plurality of index values, wherein the unique identifier is associated with the first device;

retrieving a first ordered plurality of values from the indexable data structure by accessing the indexable data structure using each of the first ordered plurality of index values as an index;

generating a second ordered plurality of index values by processing each of the index values in the first ordered plurality of index values using a predefined transformation operation;

retrieving a second ordered plurality of values from the indexable data structure by accessing the indexable data structure using each of the second ordered plurality of index values as an index;

combining the first ordered plurality of values and the second ordered plurality of values into a security key;

using the security key in processing one or more data communication messages between the first device and a remote computing device to partially or fully authenticate the first device as a trusted device within a system;

allowing the first device to perform operations only when it is authenticated as the trusted device.

2. The method of claim 1, further comprising:

procedurally generating a sequential indexable data structure; and performing a randomization operation on the sequential indexable data structure to generate the indexable data structure storing the plurality of unique values in the random or pseudorandom order.

3. The method of claim 1, wherein the predefined transformation operation further comprises one of a two's complement operation and a bitwise operation.

4. The method of claim 3, wherein the bitwise operation comprises one of an AND operation, an OR operation, a XOR operation, a NOT operation and a shift operation.

5. The method of claim 1, wherein the unique identifier comprises a Zigbee Extended User Identifier (EUID), wherein the unique identifier comprises an 8-byte value, and wherein the security key comprises a 16-byte value.

6. The method of claim 1, wherein combining the first ordered plurality of values and the second ordered plurality of values comprises concatenating the second ordered plurality of values onto an end of the first ordered plurality of values.

7. The method of claim 1, wherein using the security key in processing one or more data communication messages between the first device and the remote computing device further comprises:

joining a first data communications network using the security key, while the first device is in an unauthenticated state;

performing an asymmetric key exchange between the first device and the remote computing device, to authenticate the first device, wherein the first device is in an authenticated state upon successful completion of the asymmetric key exchange between the first device and the remote computing device.

8. A non-transitory computer-readable medium containing computer program code that, when executed by operation of one or more computer processors, performs an operation comprising:

dividing a unique identifier into an ordered plurality of portions, wherein the unique identifier is associated with a first device;

retrieving a plurality of values from an indexable data structure by accessing the indexable data structure using each of the plurality of portions as an index, wherein the indexable data structure stores a plurality of unique values in a random or pseudorandom order;

processing the retrieved plurality of values to generate a security key;

using the security key in processing one or more data communication messages between the first device and a remote computing device to partially or fully authenticate the first device as a trusted device within a system;

allowing the first device to perform operations only when it is authenticated as the trusted device.

9. The non-transitory computer-readable medium of claim 8, the operation further comprising:

procedurally generating a sequential indexable data structure; and performing a randomization operation on the sequential indexable data structure to generate the indexable data structure storing the plurality of unique values in the random or pseudorandom order.

10. The non-transitory computer-readable medium of claim 8, wherein processing the retrieved plurality of values to generate the security key further comprises:

generating a second plurality of values by processing each of the values in the plurality of values using a predefined transformation operation, wherein the predefined transformation operation further comprises a two's complement operation; and combining the second plurality of values to generate the security key.

11. The non-transitory computer-readable medium of claim 8, wherein the unique identifier comprises a Zigbee Extended User Identifier (EUID).

12. The non-transitory computer-readable medium of claim 8, wherein the unique identifier comprises an 8-byte value, and wherein the security key comprises an 8-byte value.

13. The non-transitory computer-readable medium of claim 8, wherein processing the retrieved plurality of values to generate a security key further comprises:

generating a second ordered plurality of portions by processing each of the portions in the ordered plurality of portions using a predefined transformation operation;

retrieving a second plurality of values from the indexable data structure by accessing the indexable data structure using each of the second ordered plurality of portions as an index; and combining the plurality of values and the second plurality of values to generate the security key, wherein combining the plurality of values and the second plurality of values comprises concatenating the second plurality of values onto an end of the first plurality of values.

14. The non-transitory computer-readable medium of claim 8, wherein using the security key in processing one or more data communication messages between the first device and the remote computing device further comprises:

joining a first data communications network using the security key, while the first device is in an unauthenticated state;

performing an asymmetric key exchange between the first device and the remote computing device, to authenticate the first device, wherein the first device is in an authenticated state upon successful completion of the asymmetric key exchange between the first device and the remote computing device.

15. A system, comprising:

one or more computer processors; and a non-transitory computer-readable memory containing computer program code that, when executed by operation of one or more computer processors, performs an operation comprising:

dividing a unique identifier into an ordered plurality of portions, wherein the unique identifier is associated with a first device;

retrieving a first ordered plurality of values from an indexable data structure by accessing the indexable data structure using each of the plurality of portions as an index, wherein the indexable data structure stores a plurality of unique values in a random or pseudorandom order;
processing the first ordered plurality of values with a predefined processing algorithm to generate a second ordered plurality of values;
combining the first ordered plurality of values and the second ordered plurality of values to generate a security key;
using the security key in processing one or more data communication messages between the first device and a remote computing device to partially or fully authenticate the first device as a trusted device within a system;
allowing the first device to perform operations only when it is authenticated as the trusted device.

16. The system of claim 15, further comprising:
procedurally generating a sequential indexable data structure; and
performing a randomization operation on the sequential indexable data structure to generate the indexable data structure storing the plurality of unique values in the random or pseudorandom order.

17. The system of claim 15, wherein the predefined processing algorithm further comprises a two's complement operation.

18. The system of claim 15, wherein the unique identifier comprises a Zigbee Extended User Identifier (EUID).

19. The system of claim 15, wherein combining the first ordered plurality of values and the second ordered plurality of values comprises concatenating the second ordered plurality of values onto an end of the first ordered plurality of values.

20. The system of claim 15, wherein using the security key in processing one or more data communication messages between the first device and the remote computing device further comprises:
joining a first data communications network using the security key, while the first device is in an unauthenticated state;
performing an asymmetric key exchange between the first device and the remote computing device, to authenticate the first device,
wherein the first device is in an authenticated state upon successful completion of the asymmetric key exchange between the first device and the remote computing device.

* * * * *